No. 722,174. PATENTED MAR. 3, 1903.
T. DAVIDSON, Jr.
KNIFE AND FORK CLEANER.
APPLICATION FILED OCT. 2, 1902.
NO MODEL.
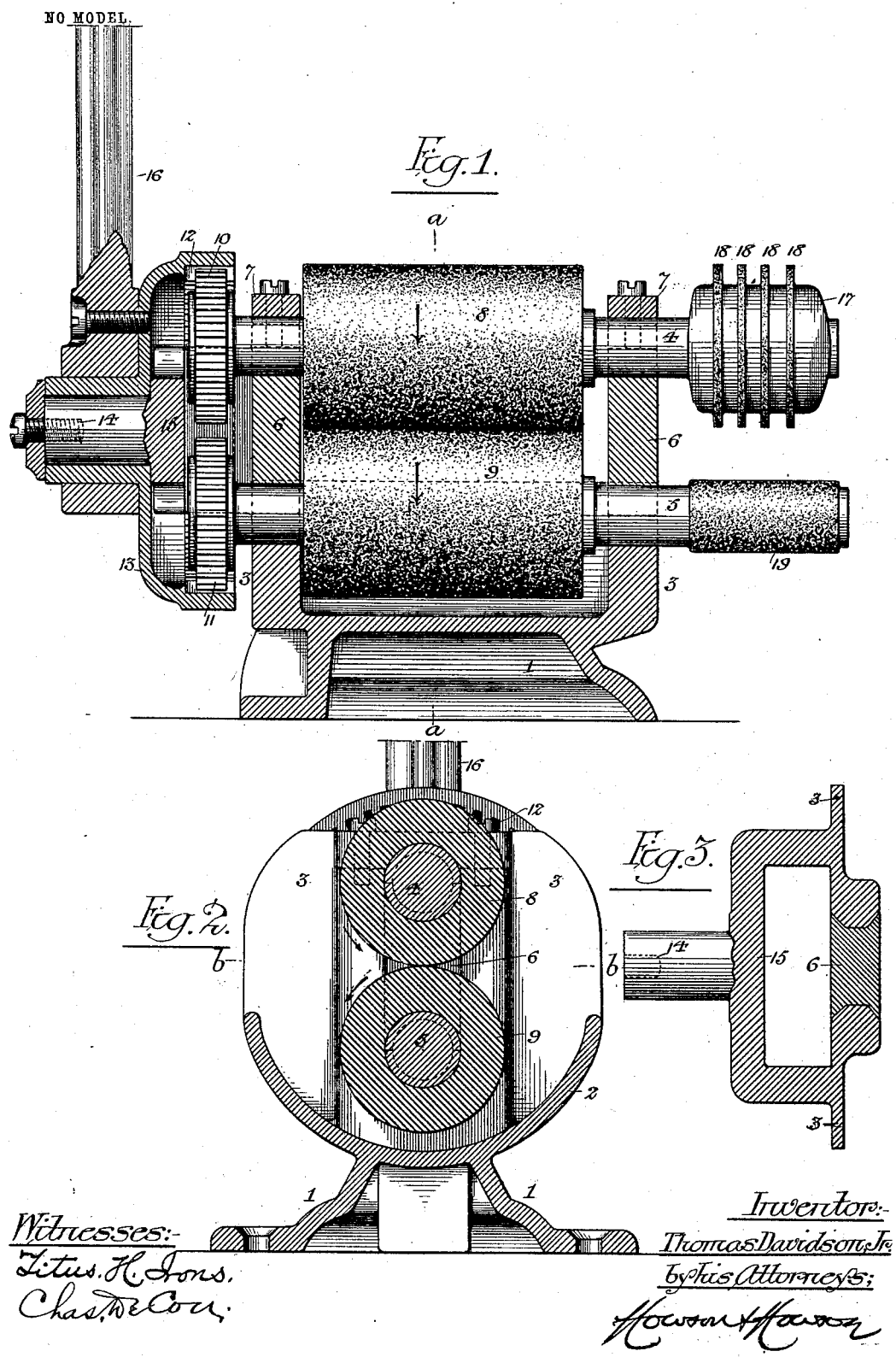

UNITED STATES PATENT OFFICE.

THOMAS DAVIDSON, JR., OF PHILADELPHIA, PENNSYLVANIA, ASSIGNOR OF ONE-HALF TO WILLIAM BEATTY, OF PHILADELPHIA, PENNSYLVANIA.

KNIFE AND FORK CLEANER.

SPECIFICATION forming part of Letters Patent No. 722,174, dated March 3, 1903.

Application filed October 2, 1902. Serial No. 125,702. (No model.)

*To all whom it may concern:*

Be it known that I, THOMAS DAVIDSON, Jr., a citizen of the United States, residing in Philadelphia, Pennsylvania, have invented certain Improvements in Knife and Fork Cleaners, of which the following is a specification.

The object of my invention is to construct a simple and effective form of knife and fork cleaner or polisher whereby proper action of the cleaning-rolls upon the knife-blade is attained without the employment of complex driving mechanism for said rolls and whereby also disks for acting upon the tines of a fork and a small roll for acting upon the stems and handles of forks and upon the handles of knives are effectively combined with the rolls which act upon the knife-blades.

In the accompanying drawings, Figure 1 is a view, partly in elevation and partly in longitudinal section, of a knife and fork cleaner constructed in accordance with my invention. Fig. 2 is a transverse section on the line $a\ a$, Fig. 1; and Fig. 3 is a sectional plan view of part of the frame of the device on the line $b\ b$, Fig. 2.

The fixed frame of the device has a base 1 for being secured to a table or bench, this base supporting a trough 2, which has at each end an upwardly-projecting wall 3, slotted for the reception of the journals of upper and lower shafts 4 and 5 and also for the reception of intermediate journal-boxes 6 and upper journal-boxes 7, whereby said shafts are properly retained in their respective positions. The shafts 4 and 5 carry the upper and lower cleaning-rollers 8 and 9, respectively, these rollers being contained longitudinally between the end walls 3 of the device and the lower roller 9 extending into the trough 2, so that a supply of water can be maintained in the trough for moistening the lower roller when such moistening of the same is required. The upper shaft 4 has at one end a spur-wheel 10, and the lower shaft has at the like end a spur-wheel 11, and both these spur-wheels mesh with an internal annular rack 12 on a flanged disk 13, which is mounted so as to be free to turn upon a stud 14, the latter projecting outwardly from a yoke 15, which is secured to or forms part of one of the end walls 3 of the fixed structure. The disk 13 is provided with a projecting handle 16, whereby it may be readily turned, such turning movement effecting rotation of both of the cleaning-rollers 8 and 9 in the same direction, as indicated, for instance, by the arrows in Figs. 1 and 2. The rollers therefore have no tendency to pull forward or push backward a knife-blade inserted between them, the movements of the knife being only such as are imparted to it by the attendant. Hence there is rapid and effective cleaning or polishing action upon both faces of the blade simultaneously, and the thorough cleaning or polishing of the blade is consequently effected in a short time.

That end of the upper shaft 4 opposite to the end which carries the spur-wheel 10 projects beyond the fixed frame and is provided with a hub 17, from which project a series of disks 18, of emery or other desired cleaning or polishing material, whereby the tines of forks can be acted upon, and the lower shaft 5 projects in like manner for the reception of the small cleaning or polishing roller 19, which can be used for cleaning the stems and handles of forks or the handles of knives.

By mounting the supplementary cleaning or polishing rollers upon the projecting ends of the shafts which carry the main rollers 8 and 9 the same driving mechanism suffices for both and the number of parts is reduced to a minimum, the simplicity of construction thus attained correspondingly reducing the cost of the device.

Having thus described my invention, I claim and desire to secure by Letters Patent—

The combination of the fixed frame, upper and lower shafts mounted therein and each carrying a cleaning-roller, a spur-wheel at one end of each of said shafts, a yoke projecting from the fixed frame and having a projecting stud in the vertical plane passing through said upper and lower shafts, and a disk rotatably mounted on said stud and having an internal annular rack meshing with the spur-wheels, substantially as specified.

In testimony whereof I have signed my name to this specification in the presence of two subscribing witnesses.

THOMAS DAVIDSON, JR.

Witnesses:
WILL. A. BARR,
JOS. H. KLEIN.